US012775101B2

(12) United States Patent
McBurney

(10) Patent No.: US 12,775,101 B2

(45) Date of Patent: Oct. 27, 2026

(54) METHODS AND SYSTEMS FOR COMPUTING GNSS TIME IN GNSS RECEIVERS

(71) Applicant: oneNav, Inc., Sunnyvale, CA (US)

(72) Inventor: Paul McBurney, Palo Alto, CA (US)

(73) Assignee: oneNav, Inc., Sunnyvale, CA (US)

( * ) Notice: Subject to any disclaimer, the term of this patent is extended or adjusted under 35 U.S.C. 154(b) by 119 days.

(21) Appl. No.: 18/666,717

(22) Filed: May 16, 2024

(65) Prior Publication Data

US 2024/0427028 A1 Dec. 26, 2024

Related U.S. Application Data

(60) Provisional application No. 63/538,031, filed on Sep. 12, 2023, provisional application No. 63/522,709, filed on Jun. 22, 2023.

(51) Int. Cl.
*G01S 19/30* (2010.01)

(52) U.S. Cl.
CPC .................................... *G01S 19/30* (2013.01)

(58) Field of Classification Search
CPC ....................................................... G01S 19/30
USPC ..................................................... 342/357.69
See application file for complete search history.

(56) References Cited

U.S. PATENT DOCUMENTS

| | | | | |
|---|---|---|---|---|
| 5,402,347 A | 3/1995 | McBurney et al. | | |
| 6,191,731 B1 | 2/2001 | McBurney et al. | | |
| 10,564,290 B1 * | 2/2020 | Phan | G01S 19/37 |
| 10,663,600 B2 * | 5/2020 | Orejas | G01S 19/254 |
| 11,150,352 B2 * | 10/2021 | Kuntz | G01S 19/37 |
| 2005/0206559 A1 | 9/2005 | Diggelen et al. | |
| 2009/0213006 A1 | 8/2009 | Nayyar et al. | |
| 2017/0115400 A1 * | 4/2017 | Nayyar | G01S 19/30 |
| 2021/0364649 A1 * | 11/2021 | Phan | G01S 19/43 |
| 2021/0373179 A1 | 12/2021 | McBurney et al. | |
| 2022/0137236 A1 | 5/2022 | Conflitti et al. | |

(Continued)

OTHER PUBLICATIONS

Schroth, Georg; Ene, Alexandru; Blanch, Juan; Walter, Todd; and Enge, Per (2008) Failure Detection and Exclusion via Range Consensus. In: European Navigation Conference 2008. ENC GNSS 2008, Apr. 22, 2008-Apr. 25, 2008, Toulouse, France, 10 pages.

(Continued)

*Primary Examiner* — Harry K Liu

(74) *Attorney, Agent, or Firm* — WOMBLE BOND DICKINSON (US) LLP

(57) ABSTRACT

Methods and systems for processing GNSS signals to provide a computed fine time estimate of GNSS time. A method can include: receiving GNSS signals from GNSS SVs in a set of GNSS SVs; acquiring, from primary pseudorandom number (PRN) codes in the received GNSS signals, primary code phases for five (5) GNSS SVs, in the set of GNSS SVs, to derive pseudoranges to each of the five GNSS SVs; acquiring, from at least one secondary PRN code in the received GNSS signals, a secondary code phase of at least one GNSS SV, the acquired secondary code phase providing an estimated time data relative to an epoch boundary of the at least one secondary PRN code; and computing, with an equation based solver, an estimated GNSS time using the derived pseudoranges to each of the five GNSS SVs and the estimated time data derived from the acquired secondary code phase.

26 Claims, 6 Drawing Sheets

(56) References Cited

U.S. PATENT DOCUMENTS

| | | | | |
|---|---|---|---|---|
| 2022/0244404 | A1* | 8/2022 | Ribot | G01S 19/52 |
| 2023/0003901 | A1 | 1/2023 | Maaref et al. | |
| 2023/0050047 | A1 | 2/2023 | Maaref et al. | |
| 2023/0333261 | A1 | 10/2023 | Maaref | |

OTHER PUBLICATIONS

Petovello, Mark. “GNSS Solutions: Coarse Time Positioning”, InsideGNSS, Mar./Apr. 2012, pp. 28-31.

Van Diggelen, Frank, Abraham, Charles, “Coarse-Time AGPS: Computing TOW From Pseudorange Measurements, and the Effect on HDOP,” Proceedings of the 20th International Technical Meeting of the Satellite Division of The Institute of Navigation (ION GNSS 2007), Fort Worth, TX, Sep. 2007, pp. 357-367.

* cited by examiner

Figure 3

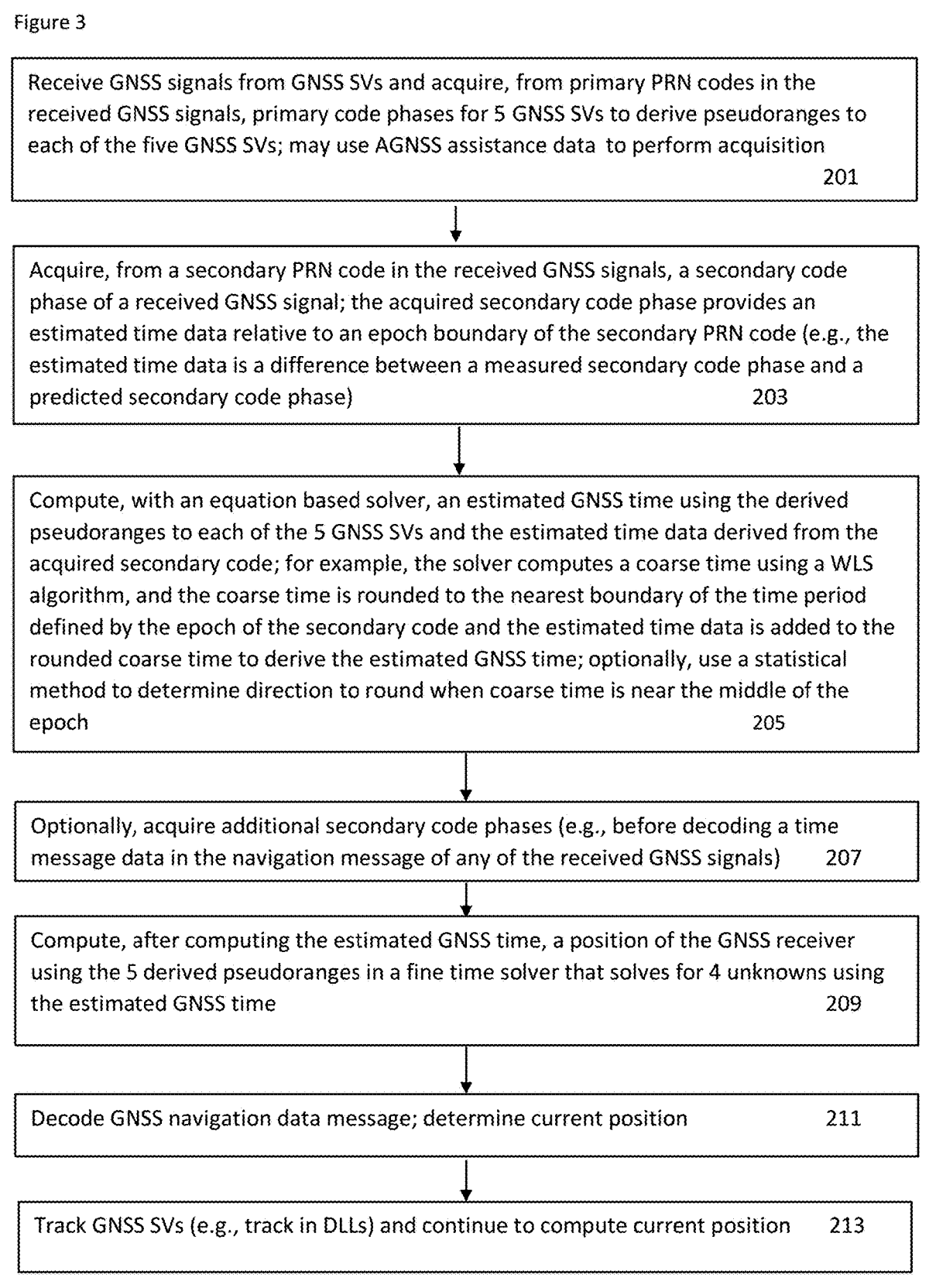

Receive GNSS signals from GNSS SVs and acquire, from primary PRN codes in the received GNSS signals, primary code phases for 5 GNSS SVs to derive pseudoranges to each of the five GNSS SVs; may use AGNSS assistance data to perform acquisition 201

↓

Acquire, from a secondary PRN code in the received GNSS signals, a secondary code phase of a received GNSS signal; the acquired secondary code phase provides an estimated time data relative to an epoch boundary of the secondary PRN code (e.g., the estimated time data is a difference between a measured secondary code phase and a predicted secondary code phase) 203

↓

Compute, with an equation based solver, an estimated GNSS time using the derived pseudoranges to each of the 5 GNSS SVs and the estimated time data derived from the acquired secondary code; for example, the solver computes a coarse time using a WLS algorithm, and the coarse time is rounded to the nearest boundary of the time period defined by the epoch of the secondary code and the estimated time data is added to the rounded coarse time to derive the estimated GNSS time; optionally, use a statistical method to determine direction to round when coarse time is near the middle of the epoch 205

↓

Optionally, acquire additional secondary code phases (e.g., before decoding a time message data in the navigation message of any of the received GNSS signals) 207

↓

Compute, after computing the estimated GNSS time, a position of the GNSS receiver using the 5 derived pseudoranges in a fine time solver that solves for 4 unknowns using the estimated GNSS time 209

↓

Decode GNSS navigation data message; determine current position 211

↓

Track GNSS SVs (e.g., track in DLLs) and continue to compute current position 213

METHODS AND SYSTEMS FOR COMPUTING GNSS TIME IN GNSS RECEIVERS

This application claims the benefit of U.S. Provisional patent application No. 63/522,709, which was filed on Jun. 22, 2023, and U.S. Provisional patent application No. 63/538,031, which was filed on Sep. 12, 2023, and both of these U.S. Provisional patent applications are hereby incorporated herein by reference.

BACKGROUND

This disclosure relates to the field of positioning systems and particularly to positioning systems that use radio signals to determine the position of receiver such as a global navigation satellite system (GNSS) receiver.

GNSS satellites (GNSS SVs) transmit GNSS signals that include pseudorandom number (PRN) codes and a navigation message that allow a GNSS receiver to determine, from the information in the GNSS signals, a position of the GNSS receiver. The navigation message includes ephemeris data about the position of the GNSS SV that transmitted the GNSS signal and time message data that, in effect, time tags the data (e.g., PRN codes) transmitted from each GNSS SV, where the time tag indicates the time of transmission of a point in the GNSS signal from the GNSS SV. As is known in the art, a GNSS receiver determines pseudoranges to GNSS SVs based on the received PRN codes and uses the ephemeris data and the time message data to determine the position of the GNSS receiver. Modernized signals have a new signal aspect called an overlay code, also referred to as secondary code, to reduced cross correlation between satellites that provides additional timing information but to date these codes have not been used in the receiver time setting process.

Conventional GNSS receivers use the time message data (e.g., z count data) in the navigation message to determine the GNSS system time (also referred to as GNSS time) for a particular GNSS constellation. This requires the GNSS receiver to receive GNSS signals containing the navigation message and decode the received GNSS signals in order to extract GNSS time from the received signals. This GNSS time is used with the position solution algorithms (e.g., a weighted least squares [WLS] algorithm) to compute the position of the GNSS receiver and provide accurate time to the GNSS receiver. However, it can be difficult, at least in some environments, to receive the navigation message and decode the navigation message correctly to produce the current GNSS time. Moreover, the time message data is often transmitted every few seconds (depending on the GNSS constellation); for example, in the case of one GNSS constellation, the time message data is transmitted every 6 seconds. As a result, it can take as long as 6 seconds to receive and begin decoding the time message data. If signal reception is poor (e.g., the GNSS receiver is in an urban canyon), it can take many multiples of 6 seconds to receive and correctly decode the time message data (e.g., 3 multiples which is 18 seconds). As a result, it often takes a fair amount of time to provide an initial position solution (also referred to as an initial position fix) while the GNSS receiver waits until it can decode GNSS time from the received GNSS signals.

GNSS receivers can use a coarse time solver that provides an estimate of GNSS time before the GNSS receiver can decode the time message data. This coarse time solver can provide an estimate of GNSS time that can be used to compute a position in the GNSS receiver and enable a position solution (also referred to as a fix) before GNSS time is decoded from a satellite navigation message, but the error in such coarse time can produce large errors in an initial position solution. The coarse time solver augments the traditional state vector of the position and clock bias states with an additional time error state. This requires an additional satellite to have a determined position solution (fix) and will also increase the effective position dilution of precision (PDOP) above the PDOP without the additional state. Furthermore, the accuracy of the coarse time estimate is affected by the measurement errors and satellite geometry and Doppler value that is reflected with DOP of the additional state. In challenging environments such as the urban canyon, the time error estimate can be poor, and this is equivalent to estimating the receiver position at the wrong time. This time error adds additional artificial measurement error proportional to the satellite range rate times time error because the satellite position is computed at the wrong time. Thus, while the coarse time solver can provide a faster time to first fix when the time message cannot be decoded, it can have poorer accuracy compared to when the time message is available, and the time error is zero.

SUMMARY OF THE DESCRIPTION

The methods and systems described in this disclosure can provide, in one embodiment, a fast computation, in a GNSS receiver, of an estimated GNSS time at a fine time level of accuracy (e.g., an accuracy of better than 1 millisecond or better than 0.5 millisecond) without decoding the GNSS navigation message from any received GNSS signals. In one embodiment, a method can include: receiving GNSS signals from GNSS SVs in a set of GNSS SVs; acquiring, from primary pseudorandom number (PRN) codes in the received GNSS signals, primary code phases for five (5) GNSS SVs, in the set of GNSS SVs, to derive pseudoranges to each of the five GNSS SVs; acquiring, from at least one secondary PRN code in the received GNSS signals, a secondary code phase of at least one GNSS SV, the acquired secondary code phase providing an estimated time data relative to an epoch boundary of the at least one secondary PRN code; and computing, with an equation based solver, an estimated GNSS time using the derived pseudoranges to each of the five GNSS SVs and the estimated time data derived from the acquired secondary code phase. In one embodiment, the estimated GNSS time can be within less than 1 millisecond of actual GNSS time. In one embodiment, the computing includes rounding a time output (e.g., a solved coarse time error output) from the equation based solver to a nearest boundary of a time period defined by an epoch of the secondary PRN code (e.g., the coarse time error output is rounded to a 100 millisecond time boundary of the secondary code in the case of the Galileo E5 GNSS signals). In one embodiment, the equation based solver is a coarse time solver that uses a weighted least squares algorithm to solve for a coarse GNSS time error (which has, in one embodiment, an uncertainty of more than 1 millisecond relative to GNSS time). In one embodiment, the estimated time data (derived from the acquired secondary code phase) is added to the rounded coarse time error to derive the estimated GNSS time.

In one embodiment, the estimated time data is determined from a difference between the measured secondary code phase and a predicted secondary code phase that is based on the GNSS receiver's estimate of time and position. With respect to the predicted secondary code phase, the GNSS receiver's estimate of time can be derived from a real time clock in the GNSS receiver or from a propagated time derived from a prior position solution that provides a prior time, and the GNSS receiver's estimate of position can be derived from assistance data provided to the GNSS receiver or from the prior position solution. The acquired secondary code phase is the measured secondary code phase, resulting from a correlation process in the GNSS receiver between a local replica of the secondary PRN code and the received secondary PRN code in the received GNSS signals. The epoch of the secondary PRN code is the duration in time of 1 frame of the secondary PRN code which repeats over time (e.g., the epoch is 100 milliseconds in the case of the Galileo E5 GNSS secondary PRN codes in the Galileo E5 GNSS signals); the estimated time data is less than the epoch (e.g., 0 to 99 milliseconds for an epoch of 100 milliseconds) and each frame includes a plurality of chips in the secondary PRN code.

In one embodiment, the estimated GNSS time is computed before decoding a time message data (e.g., z count or equivalent time stamp data) in a navigation message in any of the received GNSS signals. The estimated GNSS time (after it is computed) may be used to acquire additional secondary code phases of other GNSS signals and may be used to compute an initial position of the GNSS receiver, and these operations may occur before the GNSS receiver decodes a time message data in a navigation message in any of the received GNSS signals. The initial position can be refined with further position solutions as described further below.

In one embodiment, the equation based solver solves for five unknowns (which include three position coordinates, coarse time error and clock bias) and produces a coarse time error output that is used to derive the estimated GNSS time, and wherein the method in an embodiment further comprises: computing in a fine time solver, after computing the estimated GNSS time, a position of the GNSS receiver using the derived pseudoranges to each of the five GNSS SVs (which were used by the equation based solver to compute coarse time), wherein the fine time solver solves for only four unknowns, which include three position coordinates and clock bias. This method can reduce a PDOP (precision dilution of precision) using the derived pseudoranges to each of the five GNSS SVs in the fine time solver relative to a position derived from using the derived pseudoranges to each of the five GNSS SVs in the equation based solver. In other words, a second position solution (after the equation based solver produces the coarse time error output) in the fine time solver can produce a reduced PDOP position solution (and therefore a position with reduced error) using the four unknows and the estimated GNSS time and the same measured pseudoranges used by the equation based solver. Thus, the final position accuracy (from the position computed by the fine time solver) is improved in two ways: the time error is reduced and the PDOP is reduced.

In one embodiment, an additional method can be used to assist the rounding process used to compute the estimated GNSS time. This additional method may be used when the coarse time error output from the equation based solver is near the mid-point of the epoch of the secondary PRN code (e.g., the coarse time output is within 10 milliseconds or 5 milliseconds of the 50 millisecond mid-point of the 100 millisecond epoch for the secondary PRN codes in the Galileo E5 GNSS signals). This additional method may include computing a statistical value based on a sum of squares of residuals of a least squares solution with four unknowns (without an unknown for the coarse time error) at each of the two rounding candidates to determine a direction to round when the coarse time error output is near the mid-point of the epoch. For example, a sum of the squares of residuals of a first least squares solution (for 4 unknowns and a rounded down estimated GNSS time) is computed and compared to a computed sum of squares of residuals of a second least squares solution (for 4 unknowns and a rounded up estimated GNSS time). The residuals will not be zero in this situation; smaller sum of residuals indicate a more correct estimate of GNSS time. Hence, the comparison can indicate the direction to round. In one embodiment, the lower sum (from smaller residuals) indicates the direction to round (e.g., the sum for the first least squares solution is lower than the sum for the second least squares solution, so use the rounded down estimated GNSS time because the smaller sum of residuals indicates a more correct estimate of GNSS time). In another embodiment, additional least-squares solutions, and their corresponding sums of squares of residuals, can be computed with a coarse time error estimate that is progressively further from the center hypothesis to further identify which side of the center hypothesis has lower residuals and thus is the more likely rounding location. For example, more than two rounding candidates (e.g., four or five rounding candidates) may be used to compute additional least-squares solutions to further identify which direction to round. These additional candidates can be further from the center hypothesis than the original two candidates. These additional candidates can ensure that the selected candidate is at the minimum of the a posteriori residuals curve. In addition, an outlier rejection algorithm, such as a RANSAC (random sample consensus) algorithm can be used to reject outliers in the set of candidates before using the results of the least-squares solutions to select the candidate. Examples of RANSAC algorithms are described in the literature, such as Schroth, G., Ene, A., Blanch, J., Walter, T., Enge, P., "Failure Detection and Exclusion via Range Consensus", *European Navigation Conference*, Toulouse, France, 2008. An outlier rejection algorithm can be particularly useful when the GNSS receiver is in an urban canyon. In one embodiment, the algorithm may be used only when the GNSS receiver determines it is likely in an urban canyon.

The embodiments described herein also include systems such as GNSS receivers. In one embodiment, a GNSS receiver can include the following elements: an antenna to receive GNSS signals from GNSS SVs; an RF front end coupled to the antenna to amplify the GNSS signals; an analog to digital converter (ADC) coupled to the RF front end to generate a digital representation of received GNSS signals; a baseband memory coupled to the ADC to store the digital representation; a GNSS processing system coupled to the baseband memory to process the received GNSS signals, the GNSS processing system including a set of correlators that provide correlation outputs, wherein the GNSS processing system includes processing logic to acquire, from primary pseudorandom number (PRN) codes in the received GNSS signals, primary code phases for five (5) GNSS SVs, in the set of GNSS SVs, to derive pseudoranges to each of the five GNSS SVs; and wherein the GNSS processing system includes processing logic to acquire, from at least one secondary PRN code in the received GNSS signals, a secondary code phase of at least one GNSS SV, the acquired secondary code phase providing an estimated time data (e.g., a fine time error) relative to an epoch boundary of the at least one secondary PRN code (e.g., the estimated time data can be based on the difference between the measured secondary code phase and a predicted secondary code phase that is based on the GNSS receiver's estimate of time and position); and wherein the GNSS processing system includes processing logic to compute, with an equation based solver, an estimated GNSS time using the derived pseudoranges to each of the five GNSS SVs and the estimated time data derived from the acquired secondary code phase and the predicted secondary code phase.

In one embodiment, the GNSS processing system uses the equation based solver to compute a coarse time error using a weighted least squares algorithm, and the coarse time error is rounded to a nearest boundary of a time period defined by an epoch of the secondary PRN code, and the estimated time data (e.g., fine time error) is added to the rounded coarse time error to derive the estimated GNSS time. In one embodiment, the GNSS estimated time is computed before decoding a time message data in a navigation message in any of the received GNSS signals, the time message data including one of: z count data or equivalent data from which GNSS time can be derived. In addition, the GNSS processing system can acquire, using the estimated GNSS time, additional secondary PRN code phases before decoding the time message data in any of the received GNSS signals. In one embodiment, the acquired secondary PRN code phase is a measured PRN code phase, resulting from a correlation process in the GNSS receiver between a local replica of the secondary PRN code and the received secondary PRN code, and the estimated time data is determined from a difference between the measured secondary code phase and a predicted secondary code phase that is based on the GNSS receiver's estimate of time and position. With respect to the predicted secondary code phase, the GNSS receiver's estimate of time can be derived from a real time clock in the GNSS receiver or from a propagated time derived from a prior position solution that provides a prior time, and the GNSS receiver's estimate of position can be derived from assistance data provided to the GNSS receiver or from the prior position solution.

In one embodiment, the GNSS processing system uses the equation based solver to solve for five unknowns (which include three position coordinates, coarse time error and clock bias) and produces a coarse time error output that is used to derive the estimated GNSS time, and the GNSS processing system further computes in a fine time solver, after computing the estimated GNSS time, a position of the GNSS receiver using the derived pseudoranges to each of the five GNSS SVs (which were used by the equation based solver to compute coarse time), wherein the fine time solver solves for only four unknowns, which include three position coordinates and clock bias. This approach can reduce a PDOP (precision dilution of precision) using the derived pseudoranges to each of the five GNSS SVs in the fine time solver relative to a position derived from using the derived pseudoranges to each of the five GNSS SVs in the equation based solver. In other words, a second position solution (after the equation based solver produces the coarse time output) in the fine time solver can produce a reduced PDOP position solution using the four unknows and the estimated GNSS time and the same measured pseudoranges used by the equation based solver. The GNSS processing system may also use a method for assisting in the process of rounding as described herein.

The aspects and embodiments described herein can include non-transitory machine readable media that can store executable computer program instructions that when executed cause one or more data processing systems (e.g., one or more GNSS processing systems or processing logic in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems, such as GNSS receivers or portions of GNSS receivers, that are built or programmed to perform these methods. For example, a data processing system can be built with hardware logic to perform these methods or can be programmed with a computer program to perform these methods and such a data processing system can be considered a GNSS processing system or GNSS processing logic. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., with oneNav, Inc. as the Applicant, and this patent application is hereby incorporated herein by reference. See US published patent application US 2022/0137236 which is a published version of this patent application.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 3 is a flow chart that shows another method according to an embodiment.

DETAILED DESCRIPTION

Figure 1:
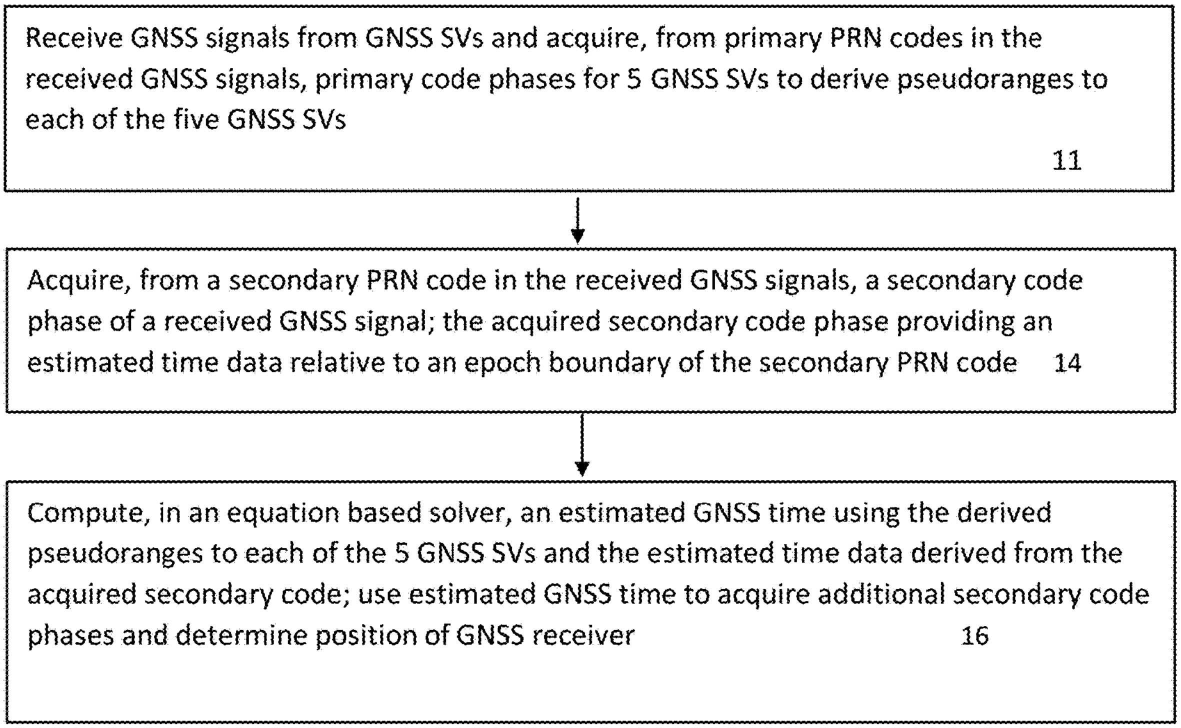
FIG. 1 is a flow chart that shows a method according to one embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

One key parameter used to assess the performance of a GNSS receiver is time to first fix (TTFF); this is the time it takes the GNSS receiver to produce a first position solution (which solution specifies in some format the location of the receiver, such as a latitude and a longitude). This first position solution is typically the first in a series of iterative position solutions over time. Conventional GNSS receivers use the time message data (e.g., z count or equivalent data) in the navigation message that is transmitted by the GNSS satellites (SVs) to get GNSS time, and this GNSS time is used, along with measured pseudoranges and SV ephemeris data, to determine the position of the GNSS receiver. Thus, the TTFF for a conventional GNSS receiver is limited by the availability of the time message data and the ability to correctly decode that data; in the case of one GNSS constellation, that data becomes available once every 6 seconds and it may be difficult to decode in some signal environments (e.g., urban canyons). As a result, it can take at least 6 seconds (and often much more) before a first fix is available. In the case of assisted GNSS (AGNSS) systems in which assistance data (e.g., approximate location and approximate time and SV ephemeris data) is provided to the GNSS, it is possible to achieve faster TTFFs, but such assistance data is not always available to GNSS receivers; TTFF is usually faster in the case of a "warm" start (e.g., a recent prior position and time data is available) as opposed to a "cold" start. The embodiments described herein can achieve fast TTFFs without requiring the decoding of the time message data and can also produce position solutions that are more accurate (than conventional approaches) without requiring the decoding of the time message data. Moreover, the embodiments can also produce position solutions with lower PDOP (position dilution of precision). Thus, the embodiments described herein can provide reasonably accurate and quick position solutions (which in turn allow the iterative process to improve the position solution over time). The embodiments described herein can be used in GNSS receivers that use only the L5 band of GNSS signals or in GNSS receivers that use both the L1 and the L5 band of GNSS signals (the so called L1/L5 hybrid GNSS receivers). The embodiments used in L5 only GNSS receivers can benefit from lower measurement error due to the lower thermal noise and lower multipath noise that is inherent in the L5 GNSS signals.

A method according to one embodiment is shown in FIG. 1. This method can be performed in the GNSS receivers described below or also in the GNSS receivers described in US published patent application US 2022/0137236 or the GNSS receivers described in US published patent application US 2021/0373179; both of these US published patent applications are hereby incorporated herein by reference. In operation 11 in FIG. 1, a GNSS receiver can receive GNSS signals from GNSS SVs; these received GNSS signals preferably have secondary PRN codes that have durations in time or epochs that are sufficiently large to accommodate the errors in typical coarse time solutions using techniques described herein. For example, in the case of the Galileo E5 GNSS signals, the secondary PRN codes for the E5aQ and E5bQ GNSS signals each contain 100 chips within one frame which has a duration of 100 milliseconds (ms); as is known in the art, the frame of chips in the secondary PRN code repeats over time. The epochs of secondary PRN codes for the E5aQ and E5bQ are thus 100 ms. These epochs are expected to be sufficiently large to provide the functionality described herein to compute an estimated GNSS time. Other GNSS constellations have similar epochs for their secondary PRN codes. The GNSS receiver can receive the GNSS signals from all available GNSS SVs in view of the receiver or a selected subset (depending on the configuration of the receiver); the selected subset may be based on the availability of the desired secondary PRN codes. In one embodiment, the GNSS receiver may initially select a subset of the signals from each GNSS SV (e.g., the sideband B GNSS signals from the Galileo SVs, such as the E5bQ component in those signals, may provide a faster solution of estimated GNSS time than the sideband A components). In addition to the received secondary PRN codes, the received GNSS signals include primary PRN codes as in known in the art. In operation 11, the GNSS receiver performs a set of correlation operations to acquire, from the primary PRN codes in the received GNSS signals, primary PRN code phases for 5 GNSS SVs in order to derive pseudoranges to each of the five GNSS SVs. Each acquired code phase, as is known in the art, provides a measured pseudorange to the SV that transmitted the GNSS signals which were measured to acquire and derive the respective pseudorange. Five pseudoranges are required, in one embodiment, as explained further below in order to solve for 5 unknowns. The set of correlation operations may include conventional, hardware time domain correlations or may use frequency domain correlations (e.g., see published US patent application US 2022/0137236) or other approaches known in the art. The acquisition process, as in known in the art, involves a correlation process in the GNSS receiver between a local replica of the PRN code and the received PRN code.

In operation 14 shown in FIG. 1, the GNSS receiver acquires from a secondary PRN code in the received GNSS signals a secondary PRN code phase of a received GNSS signal which contains a secondary code having the desired epoch. The secondary PRN code phase can be acquired using time domain correlators or frequency domain correlators in a correlation process. US published patent application US 2021/0373179 provides some examples of some techniques for acquiring secondary PRN codes in L5 band GNSS signals. The acquisition of the secondary PRN code phase results from the correlation process, using techniques known in the art, in the GNSS receiver between a local replica of the secondary PRN code and the received secondary PRN code in one embodiment. The acquired secondary PRN code phase can then be used in operation 14 to compute an estimated time data relative to an epoch boundary of the secondary PRN code as further described below. In one embodiment, the estimated time data is the difference between the measured secondary PRN code phase and a predicted secondary PRN code phase as described further below. In one embodiment, the estimated time data is used, as explained further below, as a correction to the coarse time computed error after a rounding of the coarse time computed error to the nearest boundary of an epoch of the secondary code of the GNSS signal.

In operation 16, the GNSS receiver uses a coarse time solver, which is also referred to herein as an equation based solver, to compute an estimated GNSS time using the five derived pseudoranges (from the five acquired code phases in operation 11 of FIG. 1) and the estimated time data (derived from the acquired secondary code in operation 14 and may be derived as explained further below). Further details about an example of how the coarse time solver computes this estimated GNSS time is provided below in conjunction with FIGS. 2 and 3. The estimated GNSS time that is computed in operation 16 can be considered a fine time in the GNSS receiver, and it represents the GNSS receiver's estimate of GNSS time (i.e., the GNSS system time used in the GNSS SVs and transmitted by the SVs in the time message data). Fine time can be defined by its level of accuracy (or uncertainty) relative to GNSS time; in other words, how close the fine time value is to GNSS time. In one embodiment, fine time in the GNSS receiver is within 1 millisecond (or better) of GNSS time; in another embodiment, fine time is expected to be within 0.5 millisecond (or better) of GNSS time. Fine time in the GNSS receiver has a higher accuracy (and therefore a lower error) than coarse time in the GNSS receiver. Coarse time can be defined as a level of accuracy that is within several seconds (e.g., 5 seconds) of GNSS time. Fine time and coarse time are known terms of art used in the GNSS field. In some situations, fine time may be defined by a lower level of accuracy. Once the GNSS receiver computes the estimated GNSS time in operation 16, it can use the estimated GNSS time to determine the position of the GNSS receiver and to acquire additional secondary PRN code phases. As is known in the art, the estimated GNSS time can be expressed as an offset or correction of a real time clock or timer used in the GNSS receiver in one embodiment. In one embodiment, the real time clock or timer uses a millisecond time-base (i.e., it counts time with at least a one millisecond resolution) driven by a first oscillator, and a starting estimate of the time of the GNSS receiver's real time clock or timer can be initialized based on an external real time clock device that is based on a second lower power oscillator that is calibrated based on a previously measured GNSS time or on a time estimate derived from an external GNSS time estimate such a time assistance data from a cellular telephone network or other network (e.g., from an assistance servers shown in FIG. 6).

Figure 2:
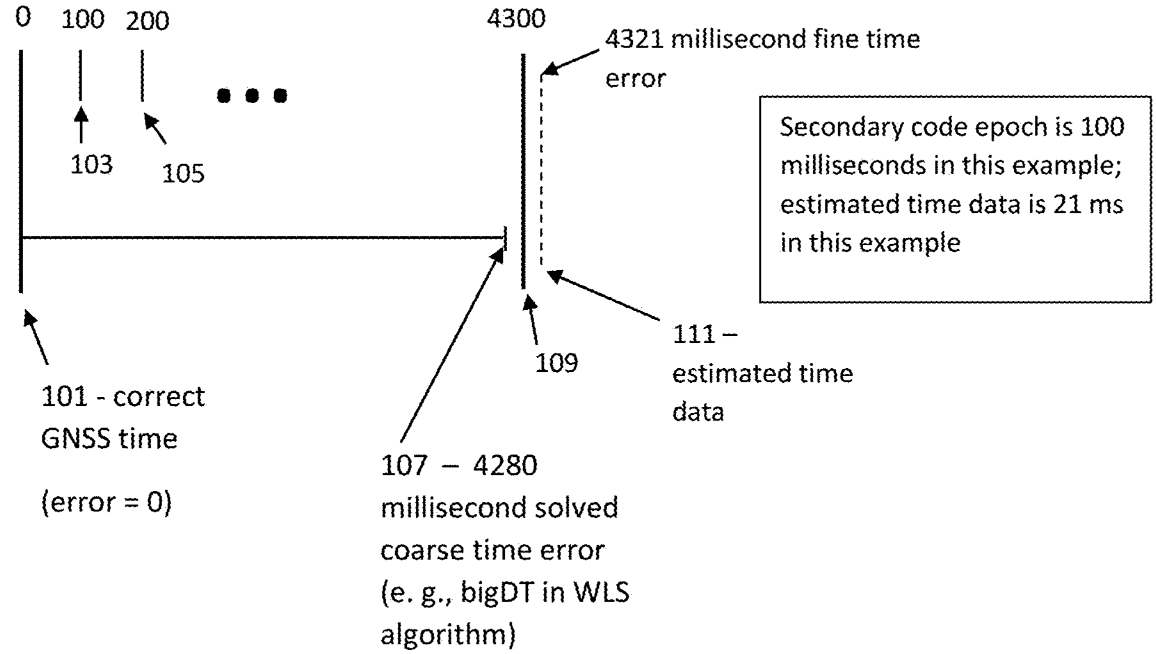
FIG. 2 depicts an example of an embodiment.

FIG. 2 provides a pictorial representation of an embodiment of the methods described herein. This pictorial representation shows a timeline that depicts the error of the GNSS receiver's real time clock (RTC) relative to GNSS time of a constellation of GNSS SVs. In this example, the correct GNSS time 101 (the GNSS transmission time, such as z count, sent by one or more of the GNSS SVs in a constellation of GNSS SVs) is shown at the far-left end of this timeline. In this example, the epoch of the secondary PRN code is 100 ms. Time markers 103, 105, and 109 represent time points relative to the correct GNSS time 101 (either before or after GNSS time 101 which has an error or offset of 0 seconds) that are an integer number of the secondary code epoch; for example, time marker 103 can be 100 milliseconds (ms) after GNSS time 101 and time marker 105 can be 200 ms after GNSS time 105 and time marker 109 can be 4300 ms (4.3 seconds) after GNSS time 101. Time marker 107 shows the result of a coarse time error solution using a coarse time solver (e.g., in operation 16 in FIG. 1 or operation 205 in FIG. 3); in this example shown in FIG. 2, the coarse time solver has computed a coarse time error estimate of 4280 ms which represents an offset (correction of coarse time error) of 4280 ms after GNSS time 101. In this example, the estimated time data 111 is 21 ms and is computed from the acquired secondary PRN code; in one embodiment, the estimated time data is the difference in time between the measured secondary PRN code phase and the predicted secondary PRN code phase. The coarse time solver in this example can be a least squares or weighted least squares (WLS) algorithm that is modified to include 5 unknowns (instead of the conventional 4 unknowns used in WLS algorithms used to compute a position solution from measured pseudoranges). The 5 unknowns are: 3 position coordinates (e.g., x, y, z), common clock bias and the coarse time error (where the coarse time error is the additional, 5th unknown). The coarse time solver uses, as inputs, the 5 measured pseudoranges to 5 GNSS SVs (e.g., from operation 11 in FIG. 1 or operation 201 in FIG. 3). An example, according to one embodiment, of the equations used in this coarse time solver is provided below. As shown in FIG. 2, the computed coarse time error of 4280 ms (which is an output from the coarse time solver) is rounded to the nearest 100 ms (so 4280 ms is rounded to 4300 ms), and then the estimated time data is added to this rounded coarse time error value (to provide a fine time error of 4321 ms (4300+21)). This fine time error can be used to correct the real time clock's output to provide the GNSS receiver's estimate of GNSS time. In this example, 4321 ms would be subtracted from the value of the real time clock of the GNSS receiver to produce the GNSS receiver's estimate of GNSS time.

FIG. 3 shows another example according to an embodiment described herein. This example in FIG. 3 is more detailed than the example shown in FIG. 1. In operation 201 in FIG. 3, a GNSS receiver receives GNSS signals from GNSS SVs and acquires, from the primary PRN codes in the received GNSS signals, primary code phases for five (5) GNSS SVs to derive five pseudoranges to the set of 5 GNSS SVs. These five pseudoranges will be used by a coarse time solver in operation 205. The GNSS receiver, in operation 201, may use GNSS assistance data such as approximate location/position, approximate time, GNSS almanac data, SV ephemeris, and SV Doppler data (indicating expected Doppler values to GNSS SVs in view of an approximate location) in the process of acquiring the primary PRN codes; the use of GNSS assistance data can decrease the time to acquire the five GNSS signals. In operation 203, the GNSS receiver acquires, from a secondary PRN code in the GNSS receiver, a secondary PRN code phase from at least one of the GNSS signals. In one embodiment, the secondary PRN code has an epoch of 100 ms; this epoch provides a sufficient period of time to fit at least most possible errors in the coarse computed time error into this epoch (e.g., most expected errors in time with a coarse time computed time error are less than this epoch). This acquired secondary PRN code phase can be used to compute an estimated time data relative to an epoch of the secondary code. In one embodiment, the estimated time data can be the difference between the measured secondary PRN code phase (from the acquired secondary PRN code phase) and a predicted secondary PRN code phase. The predicted secondary PRN code phase can be, in one embodiment, a predicted secondary PRN code phase based upon the GNSS receiver's estimate of time and position. The GNSS receiver's estimate of time can be derived from the GNSS receiver's real time clock or from a propagated time derived from a prior position solution that provides time, and the GNSS receiver's estimate of position can be derived from approximate position from GNSS assistance data or from a prior position solution. As is known in the art, knowledge of a position of the GNSS receiver and time (and SV ephemeris data) can allow a GNSS receiver to predict a code phase of a received GNSS signal.

In operation 205, the GNSS receiver can compute, with a coarse time solver, an estimated GNSS time in the GNSS receiver using the five derived pseudoranges from operation 201 as inputs to the coarse time solver. In one embodiment a least squares algorithm or a WLS algorithm can be used by the coarse time solver to compute a coarse time error. The coarse time solver can use the conventional linearized representation of the pseudorange equation with the addition of the 5th unknown (the coarse time error variable); an example of the matrix equation is provided further below. The matrix equation includes the information matrix and the state matrix (which contains the 5 unknowns/variables—3 position coordinates, clock bias and the coarse time error). The output of the coarse time solver includes the 3 position coordinates (e.g., x, y, and z) and the coarse time error; the position coordinates may be used, but as described below it may be better to use operation 209 to compute position coordinates again. The computed coarse time error from operation 205 is rounded, in one embodiment, to the nearest boundary of the time period defined by the epoch of the secondary code. In one embodiment, the epoch is 100 ms, so the computed coarse time error is rounded to the nearest 100 ms. FIG. 2 shows an example of this rounding. Then the estimated time data from operation 203 is added to the rounded coarse time error to produce the estimated GNSS time. FIG. 2 shows an example of the estimated time data being added to the rounded coarse time error.

In one embodiment, a statistical method may be used in operation 205 to determine a direction to round when the computed coarse time error is near the middle of the epoch. For example, when the computed coarse time error is within 10 ms or 5 ms of the middle of the epoch (e.g., the computed coarse time error is in the range of XX40 ms to XX60 ms for a 100 ms epoch), the statistical method may be used because the computed coarse time error is near the middle of the epoch. A 10 ms value for deciding when to use the statistical method will mean that the method will be used more often than a 5 ms value. The statistical method can produce a statistical value that indicates the direction to round. This statistical method may include computing a statistical value based on a sum of squares of residuals of a least squares solution with four unknowns (without an unknown for the coarse time error) at each of the two rounding candidates to determine a direction to round when the coarse time error output is near the mid-point of the epoch. For example, a sum of the squares of residuals of a first least squares solution (for 4 unknowns and a rounded down estimated GNSS time) is computed and compared to a computed sum of squares of residuals of a second least squares solution (for 4 unknowns and a rounded up estimated GNSS time). The first and second least squares solutions can both use the same 5 derived pseudoranges from operation 201 (instead of using new pseudoranges). The comparison (between the computed sums which are the statistical values in one embodiment) can indicate the direction to round. In one embodiment, the lower sum indicates the direction to round (e.g., the sum for the first least squares solution is lower than the sum for the second least squares solution, so use the rounded down estimated GNSS time). The larger sum will have a time error of predicted satellite positions and hence will exhibit a larger a posteriori sums of squares of residuals. Note that the residuals (which may be referred to as a posteriori residuals) will not be zero as there are 5 pseudorange measurements and 4 unknowns. In one embodiment, more than two rounding candidates may be used in this statistical approach. For example, four or five rounding candidates can be used, and this may be particularly helpful when the GNSS receiver is in an urban canyon. In this example, four or five sums of squares of residuals of four or five least squares solution are computed and then compared to find the smallest sum of squares which corresponds to the desired rounding candidate out of the set of four or five rounding candidates. These additional candidates can be further from the center hypothesis than the original two candidates. These additional candidates can ensure that the selected candidate is at the minimum of the a posteriori residuals curve. In one embodiment, the comparison of the sums of squares can use a confidence requirement that the smallest sum of squares is much smaller (e.g., 50% smaller or 25% smaller) than the next smallest sum of squares; this confidence requirement can boost the level of confidence that the selected rounding candidate will produce an accurate fine time estimate. In addition, an outlier rejection algorithm, such as a RANSAC (random sample consensus) algorithm can be used to reject outliers in the set of candidates before using the results of the least-squares solutions to select the candidate. Examples of RANSAC algorithms are described in the literature, such as Schroth, G., Ene, A., Blanch, J., Walter, T., Enge, P., "Failure Detection and Exclusion via Range Consensus", *European Navigation Conference*, Toulouse, France, 2008. An outlier rejection algorithm can be particularly useful when the GNSS receiver is in an urban canyon. In one embodiment, the algorithm may be used only when the GNSS receiver determines it is likely in an urban canyon. The method as shown in FIG. 3 can optionally use the estimated GNSS time to acquire additional secondary code phases in operation 207. In one embodiment, operations 201, 203, 205 and 207 can all occur before the GNSS receiver is able to decode any time message data in any GNSS navigation data message from any received GNSS signal. As noted above, decoding the time message data or the GNSS navigation data message can be difficult in some signal environments. The additional acquired secondary code phases from operation 207 can be used to validate the prior acquired code phase (from operation 203).

The GNSS receiver, in one embodiment in operation 209, can recompute the position of the GNSS receiver with a fine time solver using the same 5 derived pseudoranges from operation 201 and the estimated GNSS time from operation 205. In this operation 209, the fine time solver solves for 4 unknowns (the 3 position coordinates and the clock bias) using the 5 derived pseudoranges from operation 201 and the estimated GNSS time as inputs. The fine time solver can be a conventional position solver that uses a least squares method to compute the position coordinates and the clock bias. The resulting position solution should have a better (reduced) position dilution of precision (PDOP) relative to the position solution from the coarse time solver in operation 205. Thus, without having to derive new pseudoranges after operation 201, the GNSS receiver can produce an improved position solution which can be used in subsequent position solutions (e.g., during tracking).

The GNSS receiver can in operation 211 decode any received GNSS navigation data to extract SV ephemeris and the time message data from the received GNSS signal(s) in order to improve the accuracy of the subsequent position solutions. The GNSS receiver can perform conventional tracking of the GNSS signals in operation 213 and continue to compute subsequent position solutions as the GNSS receiver tracks the GNSS SVs over time. The operations 211 and 213 can use the known and conventional techniques for decoding the GNSS navigation data in the GNSS signals and can use the known and conventional techniques for tracking the GNSS SVs and determining position solutions.

Coarse Time Solver

In one embodiment, the GNSS receiver can use a GNSS processing system or other processing logic to implement a coarse time solver to solve a set of one or more equations, such as a matrix equation that solves for the 5 unknowns (3 position coordinates, clock bias and the coarse time error)

using the 5 derived pseudoranges as described above. One embodiment can use the following exemplary implementation.

The Equations for the Coarse Time Solver

Define the variable X as a vector of state errors defined as the true value minus the predicted value using the initial estimates ($x_0$, $y_0$, $z_0$, $b_0$, $bigDT_0$) of the true position (x, y, z, b, bigDT), where x, y, z are the three dimensional cartesian position states, b is the receiver clock bias with a range of less than one millisecond, and the system time error referred to as big delta time, or shorthand as bigDT, defines the starting time error larger than one millisecond. In one embodiment, bigDT is the coarse time error computed by the coarse time solver.

$$X = [\text{Truth} - \text{Predicted}] = [dx, dy, dz, db, dBigDT]$$

where $dx=x-x_0$, $dy=y-y_0$, $dz=z-z_0$, $db=b-b_0$, and finally $dBigDT\hat{}=BigDT-BigDT_0$ Define Y as the set of linearized measurements for each satellite formed as the measured minus predicted pseudorange based on the initial state estimate and system time error. The linearized measurement for the i-th satellite is:

$$y_i = pr_i - \left((x - x_0)^2 + (y - y_0)^2 + (z - z_0)^2\right)^{1/2} + b0 - bsv)$$

where $pr_i$=measured pseudorange to the i-th satellite b0=initial receiver clock bias estimate bsv=satellite clock bias estimate It is well known that the linearized pseudorange is linearly related to the error states through the direction cosines: the unit vector from the satellite to the receiver for the ith-satellite:

$$U_i=(u_{xi},u_{yi},u_{zi})$$

Because the satellite position is computed at the errant starting system time estimate, there is an error in the predicted satellite position estimate. Assuming low satellite acceleration, the impact on the linearized pseudorange can be approximated to first order as the satellite range-rate times the system time error BigDT. The range-rate can be represented as the dot product of the satellite cartesian direction cosines and the cartesian satellite velocity $V_{si}=(v_{xi}, v_{yi}, v_{zi})$.

The linearized measurements for the ith SV can now be represented in terms of the state errors X as:

$$y_i = -u_{xi} * dx - u_{yi} * dy - u_{zi} * dz + db + U_i * Vs_{0i} * dBigDT = H_i X$$

where $H_i=|-u_{xi}-u_{yi}-u_{zi}\ 1\ U_i*V_{S0i}|$ and X=dx dy dz db dBigDT^|

The matrix H holds each $H_i$ as a row to form an Nx5 matrix when N is the number of satellites and N>=5 to be non-singular.

$$Y=HX$$

X can be solved by using an ordinary least squares method, or weighted least squares method as follows:

$$X = (H^t H)^{-1} H^t Y$$

Where $H^t$ is the transpose of the matrix H, and $(A)^{-1}$ is the matrix inverse of the matrix A.

The equations are usually updated iteratively, so that the final state estimate X is the sum of the X estimates from each iteration where the initial state is updated with the state estimate. The iteration is terminated when the magnitude of the new X is below a threshold value that is considered insignificant relative to the desired accuracy of the estimate. For example, iteration is terminated when the dBigDT<<0.1 milliseconds.

The coarse time estimate dBigDT is considered a correction of the estimated system time. It produces an adjustment, in one embodiment, of the system time estimate by updating the offset:

$$\text{Offset new} = \text{offset current} - timeAdjustCoarseTime + b\hat{}\,(\text{rounded to nearest integer ms}).$$

Where timeAdjustCoarseTime=BigDT^, and BigDT^ was estimated from the coarse time solver and b^ is the estimated bias computed with the bias estimated concurrently with BigDT.

Equivalence of Using Time or Time Error

These terms can be used in different contexts: the system time estimate is an initial time estimate that is updated with the time error estimates obtained from the coarse time solver and the secondary code time estimate (such as the estimated time data from operation 203 in FIG. 3).

Other Time Maintenance Equations

Such a time estimate is related to the GNSS receiver hardware time base which is generally an un-adjustable millisecond counter that can be referred to as HW msec (hardware millisecond).

The best estimate of GNSS time at a particular HW msec is defined as:

$$GNSS\ \text{time} = HW\ \text{msec} + \text{offset} - b$$

Where offset is an integer delta from the HW msec in milliseconds and b is the receiver clock bias less than a millisecond.

The system time estimate is initialized be defining the offset. If an RTC (real time clock) is available, the bias is considered unknown and the offset is computed by subtracting the HW msec most closely associated in time with the RTC estimate from GNSS time estimate:

$$\text{offset} = GNSS\ \text{time estimate} - HW\ \text{msec}\ RTC\ (\text{in milliseconds})$$

Where HW msec RTC is the value of the HW msec at the time of the GNSS time estimate.

When the coarse time solver produces an estimate at a particular HW msec associated with measured pseudoranges, the offset is updated by the coarse time estimate by adding the updated bigDT estimate:

$$\text{Offset new} = \text{offset last} - BigDT + b \text{ (rounded to nearest ms)}$$

Similarly, if a z-count is acquired, the GNSS receiver will compute the predicted time of the z-count at the time of transmission by the satellite using its current estimated system time of reception of that message with millisecond precision minus an estimate of the time of transmission of the signal between the satellite and receiver. The difference between the measured and predicted z-count time is also an estimate of BigDT equal to offset plus the codephase which clarifies the exact reception time with sub-millisecond precision. The offset in milliseconds is formed from the measured minus predicted z-count by subtracting measured pseudorange and adding the bias.

When the method described of correcting the coarse time estimate with the secondary code time estimate is correct, the correction produced by the z-count should be zero.

The time estimate from the secondary code:

To estimate the secondary codephase, a time series of 1 millisecond complex primary code correlations is acquired with a duration at least up to the secondary code length N. The known secondary PRN code sequence is correlated at N possible one millisecond phase candidates (N code phase hypotheses for the secondary PRN code). The correlation is a multiplication of the N 1-millisecond complex correlator values times the N secondary code chips with a value of +/−1. The phase candidate that has the largest complex sum magnitude is chosen as the secondary codephase.

The HW msec of the 1st complex correlator value is chosen as the reference time for the secondary codephase estimate. If the peak was found at M chips from the 1st chip, then the secondary codephase referenced to the HW time base is formed as the $$\text{Secondary } codePhase \text{ estimate} = HWmsecCorr0 + M \text{ (milliseconds)}$$

Where HWmsecCorrO is the HW msec of the 1st correlation in the time series

M is the location where there was maximum correlation between the correlation time series and known secondary code sequence.

Given the initial system time and position estimates, the predicted secondary codephase at a particular receiver time is formed by subtracting the time of transmission from the reference time. Define the satellite time of week at transmission (towT) as the receiver time of week at reception minus the propagation time from the satellite to the receiver:

$$towT \text{ (seconds)} = \text{receiver time of week at reception} - \text{pseudorange in seconds}$$

where pseudorange in seconds=pseudorange in meters/speed of light

The satellite time of week in milliseconds is:

$$towTInt = \text{integer}(towT * 1000)$$

The predicted secondary code phase is the remainder of the division by the secondary code length:

Secondary codephase predicted=remainder (towTInt/pilot secondary code length)

The secondary codephase time estimate, as a correction to the system time estimate, is formed as the measured minus predicted secondary codephase. This is an example of the estimated time data in operation 203 in FIG. 3.

$$timeAdjustSecCode = \text{Secondary codephase time estimate} = \text{secondary codephase measured} - \text{secondary codephase predicted}$$

Where timeAdjustSecCode is the time adjustment in milliseconds to the offset based on the secondary code time estimate Note that the time estimate is really an estimate of the error in the current time system time estimate. But it has a range of the length of the secondary code epoch.

Different Ways to Manage the Correction of the System Time Estimate

In a first case, the secondary codephase is acquired first, and the offset is adjusted.

The timeAdjustSc is converted from 0 to 99 to +/−50 msec for a 100 msec secondary code epoch.

If (timeAdjustSc>50)timeAdjustSc−=100

Offset new=offset current−timeAdjustSecCode

This produces an offset that has a zero modulo 100 msec error.

When the coarse time solver is used, the timeAdjustCoarseTime value (BigDT) is also rounded to the nearest 100 msec. In this way, the part less than the epoch is removed from the adjustment so that the offset retains the correct sub-epoch time.

In a second case, the secondary codephase time estimate is not applied to the offset. Instead, the fractional portion of timeAdjustCoarseTime is set to timeAdjustSecCode and a single time adjustment is performed.

$$\text{Offset new} = \text{offset current} - \left(\text{floor}\left(timeAdjustCoarseTime/100, 1\right) + timeAdjustSecCode\right)$$

Where the floor function quantizes the integer division by 100 to 1.

Thus, it can be seen that the approach to apply the secondary codephase time estimate depends on the particular manner in which the offset is maintained.

Figure 4:
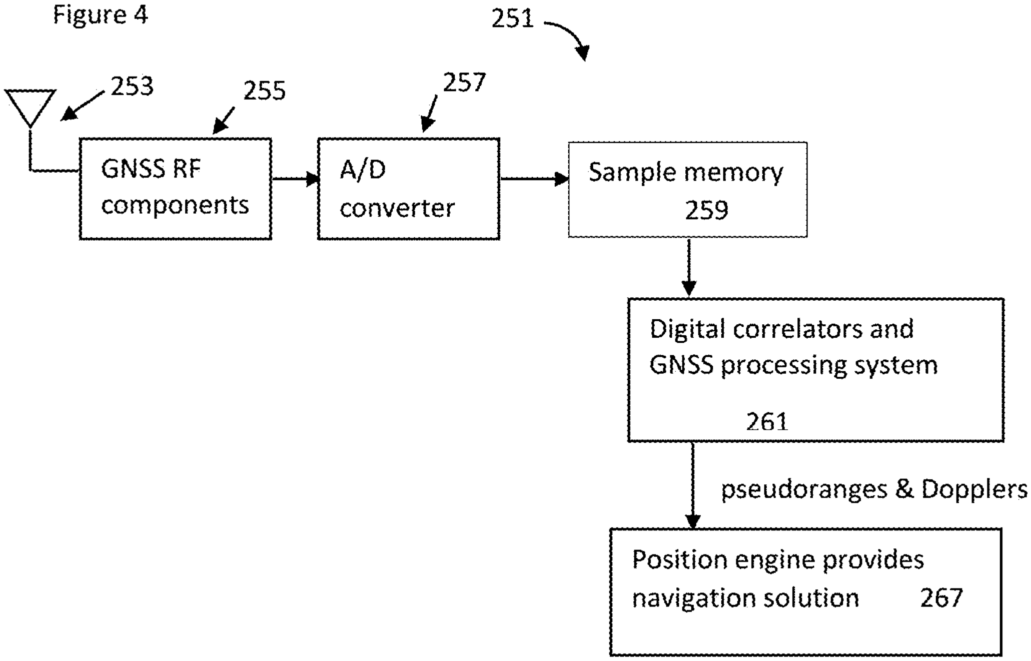
FIG. 4 shows an example of a GNSS receiver according to an embodiment.

FIG. 4 shows an example of a GNSS receiver 251 that can be one of the embodiments described herein and can perform one of the methods described herein such as one of the methods shown in FIG. 1 or 3. The GNSS receiver 251 can receive GNSS signals from GNSS SVs through the one or more GNSS antennas 253; those received GNSS signals can be amplified, filtered and down converted by GNSS RF components 255 which provides an analog output to an analog-to-digital (A/D) converter 257 which digitizes the GNSS signals. The digitized GNSS signals are then stored in a sample memory 259 for processing by a set of digital correlators in GNSS processing system 261; in one embodiment, the architecture of GNSS receiver 251 up to and including the digital correlators can be similar to one or more of the architectures of the GNSS receivers described in U.S. patent application Ser. No. 17/068,659, filed Oct. 12, 2020 by applicant oneNav, Inc. See US published application US 2022/0137236 which is a published version of this patent application. The digital correlators can use conventional time domain correlation or frequency domain correlation that use discrete Fourier transforms; the correlation operations performed by the digital correlators in the GNSS processing system 261 can acquire GNSS signals and the GNSS processing system 261 can produce measurements, such as pseudoranges and Doppler measurements, based on those acquired signals. The GNSS processing system 261 is configured in one embodiment to perform at least operations 11 and 14 in FIG. 1 or operations 201, 203, 207, 211 and 213 in the method shown in FIG. 3. For example, the GNSS processing system 261 can compute the estimated time data in operation 14 or operation 203. When the GNSS processing system is acquiring and measuring secondary PRN code phases, the GNSS processing system 261, in one embodiment, can use one or more of the techniques described in U.S. patent application Ser. No. 17/334,477, which was filed on May 28, 2021 by applicant oneNav Inc. and published as US published application 2021/0373179, and this patent application is hereby incorporated herein by reference. For example, the GNSS processing system 261 can use these techniques to acquire secondary PRN code phases of the secondary PRN codes used in certain GNSS systems such as the Galileo system of GNSS SVs in the Galileo constellation or other constellations such as the US GPS L5 constellation, the Beidou constellation and the QZSS constellation. The GNSS processing system 261 can include conventional components known in the art, such as delay locked loops (DLL) and phase locked loops (PLL) for tracking code phases and carrier frequency once the GNSS processing system 261 has acquired the primary PRN code phases. The GNSS processing system 261 can use GNSS assistance data to improve the process of acquiring and tracking GNSS signals; the assistance data can include one or more of: approximate position, approximate time, expected Dopplers to SVs in view of the approximate position, almanac data, and SV ephemeris data. The GNSS processing system 261 provides measurements, such as pseudoranges to at least 4 GNSS SVs and measured Doppler data for each of the acquired GNSS SVs, to position engine 267 which can then compute position solutions and also compute coarse time error and fine time based upon these measurements. For example, the position engine 267 can perform operation 16 in the method shown in FIG. 1 or can perform operations 205 and 209 in the method shown in FIG. 3. The position engine 267 in one embodiment can use a least squares algorithm or a WLS algorithm and may also include a Kalman filter to assist in computing the position of the GNSS receiver. The GNSS processing system 261 and the position engine 267 can be implemented in digital processing logic that includes memory to store data and processing instructions and one or more arithmetic logic units or other processing logic to process data in the methods described herein. The outputs from the position engine 267 (and optionally from GNSS processing system 261) can be provided to other components that are coupled to the GNSS receiver 251.

Figure 5:
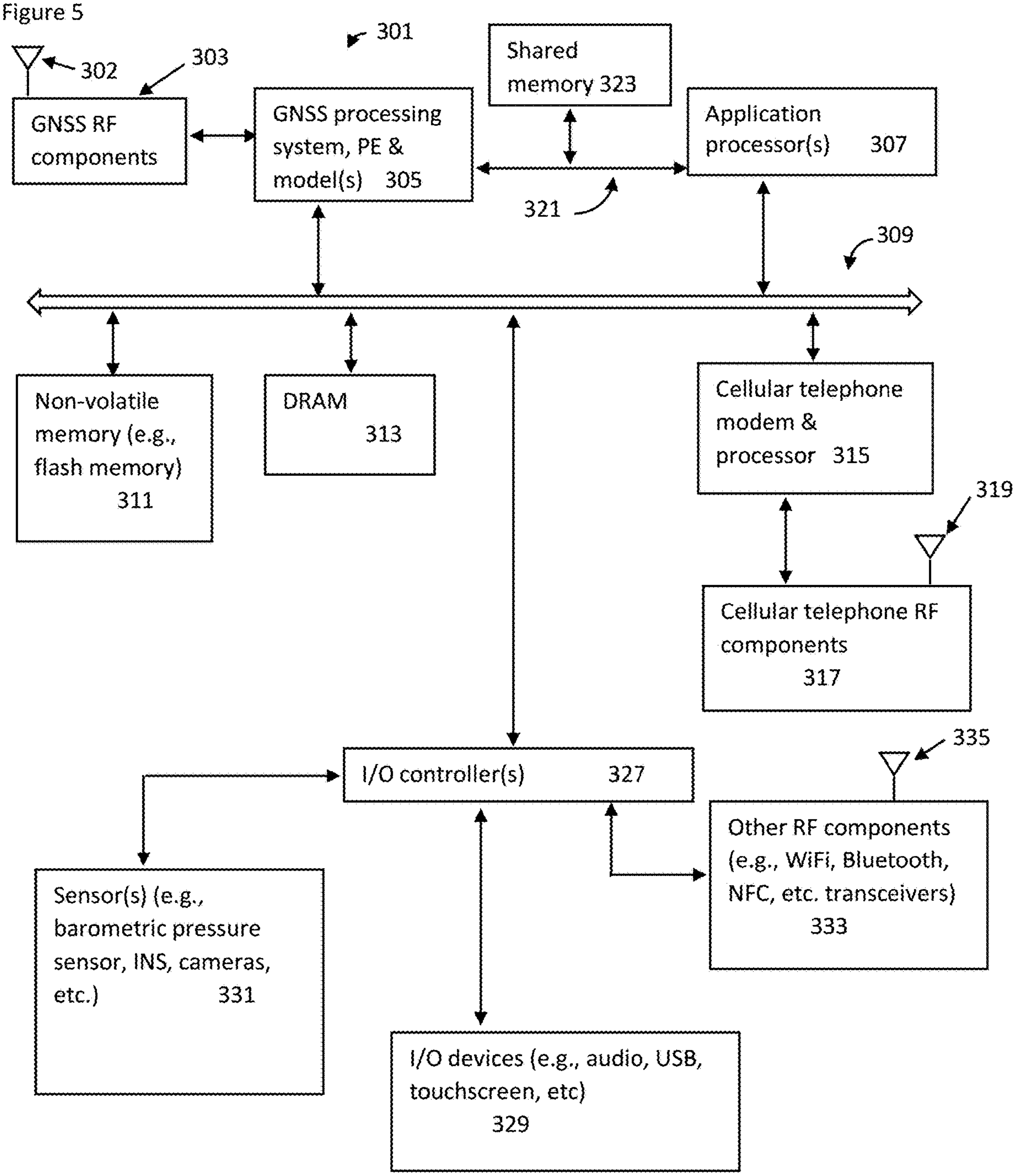
FIG. 5 shows an example of a system containing a GNSS receiver according to one embodiment.

The one or more embodiments described herein can be used in a system with other components that are coupled to a GNSS receiver that includes the one or more embodiments. Examples of such systems include, for example, smartphones, smart watches, wearables (e.g., headmounted displays or fitness wearables), internet of things (IoT) devices, vehicles (e.g., an automobile), and other devices that can include a GNSS receiver to provide position information, etc. FIG. 5 shows an example of such a system which may be a smartphone or a smartwatch or other devices. The system 301 in FIG. 5 includes GNSS RF components 303 and a GNSS antenna 302 coupled to the GNSS RF components 303; the GNSS RF components 303 can include one or more low noise amplifier(s) and one or more bandpass filters and one or more downconverters and one or more analog to digital (ADC) converters. In some embodiments, the system 301 can include an additional GNSS antenna (e.g., if the system includes a hybrid L1/L5 GNSS receiver that receives and processes GNSS signals from both of the L1 and L5 radio frequency bands). These GNSS RF components 303 can receive GNSS signals from GNSS SVs, through GNSS antenna 302, and amplify and create digital representations of the received GNSS signals and store them in one or more data sample memories that are accessed by the GNSS processing system 305. The GNSS processing system 305 can include all of the hardware and software used to acquire and track GNSS signals using, for example, digital correlators and tracking loops; the GNSS processing system may also include memory to store the data samples of the received GNSS signals. The digital correlators may be hardware correlators (e.g., see for example, US 2009/0213006) or fast Fourier transform based processing logic that uses discrete Fourier transforms (DFT) to correlate the received GNSS signals with locally generated PRN codes. Published US application number 2022/0137236 describes examples of the use of DFT processing to correlate received GNSS signals. The GNSS processing system 305 also includes processing logic that implements a measurement engine that processes the correlation results to compute pseudorange measurements and range rate measurements, and the GNSS processing system can also include a position engine that computes positions (e.g., latitude and longitude data) using known methods, such as a weighted least squares algorithm or other known methods, to compute the position of the GNSS receiver from pseudorange measurements and SV ephemeris data. The GNSS processing system 305 also extracts the ephemeris data (e.g., satellite navigation data) from the received GNSS signals. In one embodiment, the system 301 may receive the SV ephemeris data from one or more sources other than the SVs (e.g., from an assistance server as described herein). In one embodiment, the GNSS processing system 305 can include one or more trained models (e.g., trained neural networks) that provide data used by one or both of the measurement engine or the position engine. For example, the GNSS processing system 305 can include a trained model 263 to provide a selection of SVs as described in U.S. patent application Ser. No. 18/118,677 which was filed on Mar. 7, 2023 by Applicant oneNav, Inc. and which is hereby incorporated herein by reference. The GNSS processing system 305 may also include a trained model that provides excess path length (EPL) corrections to correct pseudorange measurements to mitigate multipath effects; U.S. patent application Ser. No. 17/836,116, filed on Jun. 9, 2022 by applicant oneNav Inc., provides examples of such a trained model that provides EPL corrections. The GNSS processing system 305 may also include a trained model that classifies GNSS signals as either line-of-sight signals or non-line-of-sight signals. The GNSS processing system 305 can provide computed positions (e.g., latitude and longitude data) of the GNSS receiver to other components of system 301, such as the one or more application processors 307.

The GNSS processing system 305 is coupled to the other components of system 301 through one or more buses, such as the bus 309. In one embodiment, the system 301 can include multiple buses that are coupled to each other through one or more bus interfaces as is known in the art. In one embodiment, the GNSS processing system 305 may be coupled to the one or more application processors 307 through a local bus 321 that is coupled to a shared memory 323 which can be shared between the GNSS processing system 305 and the one or more application processors 307. Published US application US 2022/0137236 provides an example of such a shared memory. In one embodiment, the GNSS processing system 305, the shared memory 323, and the one or more application processors 307 can be instantiated in a single integrated circuit which can be referred to as a system on a chip (SOC). The shared memory 323 can be used by the GNSS processing system 305 to store locally generated PRN codes for the correlation operations (if such codes are stored rather than being dynamically generated) and to store accumulation results of the correlation operations (such as accumulation results for code phase hypotheses and Doppler shift hypotheses). The one or more application processors 307 can be the main processors on system 301 that execute user programs and system programs (such as telephony applications and other communication applications, web browsers, messaging applications, maps and navigation applications, productivity applications, social media applications, etc.) on the system 301. The GNSS processing system 305 and the one or more application processors 307 can operate together to provide navigation services to the user of the system 301; furthermore, the one or more application processors or the GNSS processing system 305 can utilize other components in system 301 (such as one or more sensors 331, the cellular telephone modem 315, and/or the other RF components 333) to provide assistance data that can be combined with or fused with position data from the GNSS processing system.

The system 301 includes non-volatile memory 311 which may be any form of non-volatile memory, such as flash memory; the non-volatile memory can store system software (e.g., operating system software), system data and user applications and user data. The non-volatile memory 311 is coupled to the rest of the system 301 by bus 309. The system 301 includes DRAM 313 (dynamic random access memory) which can be consider the main memory of the system 301; it stores loaded and running user and system applications and stores system and user data as is known in the art. The DRAM 313 is coupled to the rest of the system 301 by bus 309. The system 301 also includes a cellular telephone implemented by cellular telephone modem and processor 315 and cellular telephone RF components 317 and antenna 319. The cellular telephone can be used to request and receive GNSS assistance data (e.g., satellite almanac data, SV ephemeris data, approximate position data, approximate time data, Doppler data, and correction data such as ionospheric corrections, etc.) from one or more assistance servers. The cellular telephone may also be used by the user for communication, including phone calls, text messaging, social media applications, internet applications, etc.

The system 301 also includes one or more conventional input/output (I/O) controllers 327 that couple zero or more input devices and zero or more output devices to the rest of the system 301. The I/O controllers 327 can be conventional I/O controllers used to interface an input or output device to the rest of the system 301. Some of the input devices may be sensors 331 that can provide assistance data that is used when computing or determining a position. This assistance data can be combined with or fused with a position solution from a GNSS position engine. For example, the sensors 331 may include a barometric pressure sensor that can be used to provide an estimate of the altitude of the system 301 as is known in the art. This altitude can be used by the position engine when computing a weighed least squares solution (e.g., the altitude from the barometric pressure sensor can provide the initial estimated altitude value in the weighted least squares algorithm). This altitude from the barometric pressure sensor may also be used to provide a measure of the reliability of the altitude computed from a position solution. In one embodiment, the barometric pressure sensor may be calibrated or corrected by data from an assistance service which can account for current weather and environmental conditions (using techniques known in the art) in the vicinity of the system 301 to provide a more accurate altitude. The sensors 331 may also include an inertial navigation system (INS) or dead reckoning system that can, once initialized with a correct position, provide position data about the location of the system 301 as it moves; the INS can include accelerometers and gyro devices that measure movement of the system 301 over time. Data from the INS can be combined with or fused with a position solution from a GNSS position engine using techniques known in the art. The I/O devices can also include conventional input/output devices such as audio devices (e.g., speakers and microphone), a USB interface, and a touchscreen that receives touch inputs and displays images, etc. The I/O output devices may also include other RF systems 333 with one or more antennas 335; these other RF systems may include one or more of conventional WiFi (or other wireless local area networks), Bluetooth or NFC (near field communication) RF transceivers. These other RF systems may also be used in some embodiments to deliver assistance data to the GNSS processing system or the application processors to determine a position of the system 301. For example, the WiFi transceiver may deliver assistance data (e.g., SV almanac data) to the GNSS processing system 305 and may also supply an approximate location to the GNSS processing system 305 and/or the one or more application processors (e.g., using the name (e.g., SSID) of the WiFi access point to look up the approximate location of the WiFi access point from one or more databases that are known in the art).

Figure 6:
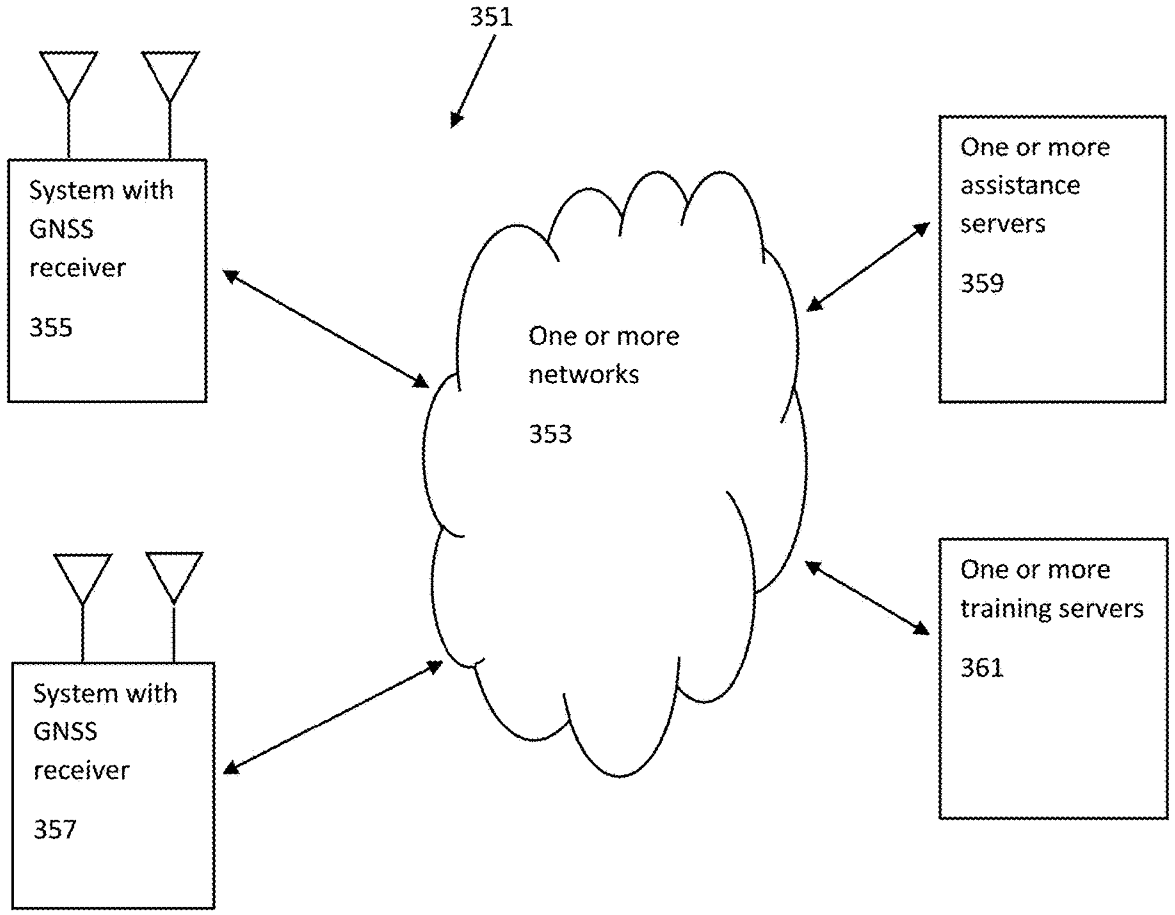
FIG. 6 shows an example of a system that can include assistance servers that can provide assistance data to GNSS receivers.

FIG. 6 shows an example of a system 351 for delivering assistance data to one or more systems 355 and 357 that each contain a GNSS receiver. The system 351 can use one or more networks 353 to deliver assistance data and provide assistance services to the systems 355 and 357. The one or more networks 353 can include one or more cellular telephone networks, one or more wired telephone networks, one or more wired Ethernet networks, one or more optical fiber networks, one or more WiFi networks, the internet, satellite communication networks, and one or more other networks and communication media known in the art. The one or more networks 353 can couple the systems 355 and 357 to the one or more assistance servers 359 and one or more training servers 361. The systems 355 and 357 represent two of potentially many (e.g., hundreds of millions) systems, each containing a GNSS receiver and one or more RF transceivers; each of the systems 355 and 357 can be an instantiation of an embodiment of the system 301 shown in FIG. 5. For example, system 355 may be a smartphone or an IoT device and system 357 may be a smartwatch or a component in a vehicle (e.g., an automobile). The one or more RF transceivers in each of systems 355 and 357 can communicate, through the one or more networks 353, with the one or more assistance servers 359 and the one or more training servers 361 to receive assistance data and assistance services from these servers 359 and 361. The one or more assistance servers 359 can provide a variety of assistance services and data depending on the embodiment. For example, the one or more assistance servers 359 can provide one or more of: SV almanac data, SV ephemeris data, Doppler data for SVs in view of a GNSS receiver, approximate position data, time assistance data (e.g., network time), ionospheric correction data, clock bias or error data for SVs, barometric pressure sensor calibration or correction data, and WiFi position look up data based upon the name of the WiFi access point. In one embodiment, a system (e.g., system 355) can request one or more assistance data from the one or more assistance servers 359 and receive the assistance data (e.g., assistance data based upon an approximate location provided by the system to the one or more assistance servers). The system (e.g., system 355) can then use the assistance data to acquire GNSS signals or to produce a position solution or both. In one embodiment, the systems 355 and 357 can also use assistance services from the one or more training servers 361 to obtain, for example, updated or new trained models for use in the GNSS processing system contained within each system (e.g., system 355 or 357). U.S. patent application Ser. No. 17/806,110, filed on Jun. 9, 2022 by applicant oneNav Inc., provides examples of such training servers that can provide updated or new trained models for use with a GNSS processing system, such as GNSS processing system 305.

What is claimed is:

1. A method for operating a GNSS receiver, the method comprising:
- receiving GNSS signals from GNSS SVs in a set of GNSS SVs;
- acquiring, from primary pseudorandom number (PRN) codes in the received GNSS signals, primary code phases for five (5) GNSS SVs, in the set of GNSS SVs, to derive pseudoranges to each of the five GNSS SVs;
- acquiring, from at least one secondary PRN code in the received GNSS signals, a secondary code phase of at least one GNSS SV, the acquired secondary code phase providing an estimated time data relative to an epoch boundary of the at least one secondary PRN code;
- computing, with an equation based solver, an estimated GNSS time using the derived pseudoranges to each of the five GNSS SVs and the estimated time data derived from the acquired secondary code phase.

2. The method as in claim 1, wherein the computing comprises a rounding, of a time output of the equation based solver, to a nearest boundary of a time period defined by an epoch of the secondary PRN code and the rounding is aligned to the nearest boundary of the acquired secondary PRN code phase.

3. The method as in claim 2, wherein the time period defined by the epoch of the secondary code is 100 milliseconds, and wherein the equation based solver computes a coarse time error using a weighted least squares algorithm, and the coarse time error is rounded to the nearest boundary of the time period defined by the epoch of the acquired secondary PRN code, and the estimated time data is added to the rounded coarse time error to derive the estimated GNSS time.

4. The method as in claim 3, wherein the epoch of the secondary code is the duration in time of 1 frame of the secondary PRN code which repeats over time and the estimated time data is less than 100 milliseconds and each frame includes a plurality of chips in the secondary PRN code.

5. The method as in claim 4, wherein the computing is performed before decoding a time message data in a navigation message in any of the received GNSS signals, the time message data comprising one of: z count data or equivalent data from which a GNSS time can be derived.

6. The method as in claim 4, wherein the acquired secondary code phase is a measured code phase, resulting from a correlation process in the GNSS receiver between a local replica of the secondary PRN code and the received secondary PRN code, and wherein the estimated time data is determined from a difference between the measured secondary code phase and a predicted secondary code phase that is based on the GNSS receiver's estimate of time and position.

7. The method as in claim 4, the method further comprising: acquiring, using the estimated GNSS time, additional secondary code phases of GNSS SVs in the set of GNSS SVs.

8. The method as in claim 7, wherein the acquiring of the additional secondary code phases is performed before decoding a time message data in a navigation message in any of the received GNSS signals.

9. The method as in claim 4, wherein the method further comprises: computing a position of the GNSS receiver using the estimated GNSS time.

10. The method as in claim 3, wherein the method further comprises: computing a statistical value which includes computing a sum of squares of residuals of a least squares solution with four unknowns, without an unknown for coarse time error, at each of two rounding candidates to determine a direction to round in cases where the coarse time error is near the mid-point of the epoch of the secondary PRN code, and wherein the statistical value indicates the direction to round.

11. The method as in claim 10, wherein the rounding candidate with the lower statistical value is the direction to round.

12. The method as in claim 6, wherein the GNSS receiver's estimate of time is derived from a real time clock in the GNSS receiver or from a propagated time derived from a prior position solution that provides a prior time, and the GNSS receiver's estimate of position is derived from assistance data provided to the GNSS receiver or from the prior position solution.

13. The method as in claim 4, wherein the equation based solver solves for 3 position coordinates.

14. The method as in claim 5, wherein the acquired secondary code phase is a measured code phase, resulting from a correlation process in the GNSS receiver between a local replica of the secondary PRN code and the received secondary PRN code, and wherein the estimated time data is determined from a difference between the measured secondary code phase and a predicted secondary code phase that is based on the GNSS receiver's estimate of time and position.

15. The method as in claim 6, wherein the equation based solver solves for five unknowns which include three position coordinates, coarse time error and clock bias, and wherein the method further comprises: computing, after computing the estimated GNSS time, a position of the GNSS receiver using the derived pseudoranges to each of the five GNSS SVs in a fine time solver that solves for only four unknowns, which include three position coordinates and clock bias, and wherein a PDOP (position dilution of precision) is reduced using the derived pseudoranges to each of the five GNSS SVs in the fine time solver relative to a position derived from using the derived pseudoranges to each of the five GNSS SVs in the equation based solver.

16. The method as in claim 3, wherein the method further comprises: computing a statistical value which includes computing a sum of squares of residuals of a least squares solution with four unknowns, without an unknown for coarse time error, at each of more than two rounding candidates to determine a direction to round in cases where the coarse time error is near the mid-point of the epoch of the secondary PRN code, and wherein the statistical value indicates the direction to round.

17. The method as in claim 16, wherein the method further comprises: determining at least one outlier of the more than two rounding candidates using a random sample consensus algorithm prior to determining a direction to round.

18. A GNSS receiver comprising:

an antenna to receive GNSS signals from a set of GNSS SVs;

an RF front end coupled to the antenna to amplify the GNSS signals;

an analog to digital converter (ADC) coupled to the RF front end to generate a digital representation of received GNSS signals;

a baseband memory coupled to the ADC to store the digital representation;

a GNSS processing system coupled to the baseband memory to process the received GNSS signals, the GNSS processing system including a set of correlators that provide correlation outputs, wherein the GNSS processing system includes processing logic to acquire, from primary pseudorandom number (PRN) codes in the received GNSS signals, primary code phases for five (5) GNSS SVs, in the set of GNSS SVs, to derive pseudoranges to each of the five GNSS SVs;

wherein the GNSS processing system includes processing logic to acquire, from at least one secondary PRN code in the received GNSS signals, a secondary code phase of at least one GNSS SV, the acquired secondary code phase providing an estimated time data relative to an epoch boundary of the at least one secondary PRN code;

wherein the GNSS processing system includes processing logic, which uses an equation based solver, to compute an estimated GNSS time using the derived pseudoranges to each of the five GNSS SVs and the estimated time data derived from the acquired secondary code phase.

19. The GNSS receiver as in claim 18, wherein the GNSS processing system computes a coarse time error using a weighted least squares algorithm, and the coarse time error is rounded to a nearest boundary of a time period defined by an epoch of the acquired secondary PRN code, and the estimated time data is added to the rounded coarse time error to derive the estimated GNSS time.

20. The GNSS receiver as in claim 19, wherein the GNSS estimated time is computed before decoding a time message data in a navigation message in any of the received GNSS signals, the time message data including one of: z count data or equivalent data from which GNSS time can be derived.

21. The GNSS receiver as in claim 19, wherein the acquired secondary code phase is a measured code phase, resulting from a correlation process in the GNSS receiver between a local replica of the secondary PRN code and the received secondary PRN code, and wherein the estimated time data is determined from a difference between the measured secondary code phase and a predicted secondary code phase that is based on the GNSS receiver's estimate of time and position.

22. The GNSS receiver as in claim 21, wherein the GNSS processing system acquires, using the estimated GNSS time, additional secondary code phases before decoding a time message data in a navigation message in any of the received GNSS signals.

23. The GNSS receiver as in claim 21, wherein the GNSS processing system computes a statistical value derived from a sum of squares of residuals of a least squares solution with four unknowns, without an unknown for coarse time error, at each of two rounding candidates to determine a direction to round in cases where the coarse time error is near the mid-point of the epoch of the secondary PRN code, and wherein the statistical value indicates the direction to round.

24. The GNSS receiver as in claim 23, wherein the rounding candidate with the lower statistical value is the direction to round.

25. The GNSS receiver as in claim 21, wherein the GNSS receiver's estimate of time is derived from a real time clock in the GNSS receiver or from a propagated time derived from a prior position solution that provides a prior time, and the GNSS receiver's estimate of position is derived from assistance data provided to the GNSS receiver or from the prior position solution.

26. The GNSS receiver as in claim 21, wherein the equation based solver solves for five unknowns which include three position coordinates, coarse time error and clock bias, and wherein the GNSS processing system computes, after computing the estimated GNSS time, a position of the GNSS receiver using the derived pseudoranges to each of the five GNSS SVs in a fine time solver that solves for only four unknowns, which include three position coordinates and clock bias, and wherein a PDOP (position dilution of precision) is reduced using the derived pseudoranges to each of the five GNSS SVs in the fine time solver relative to a position derived from using the derived pseudoranges to each of the five GNSS SVs in the equation based solver.

* * * * *